Feb. 24, 1959 A. J. VARVARO 2,874,761
BEAD SEATING AND INFLATING DEVICE FOR TUBELESS TIRES
Filed Aug. 26, 1954
FIG-1
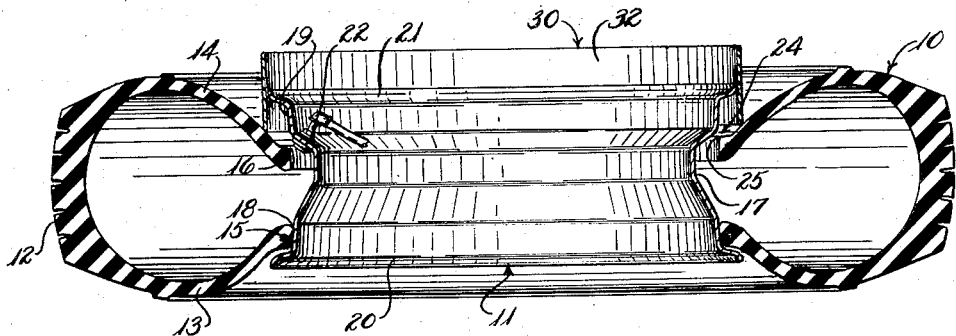
FIG-2
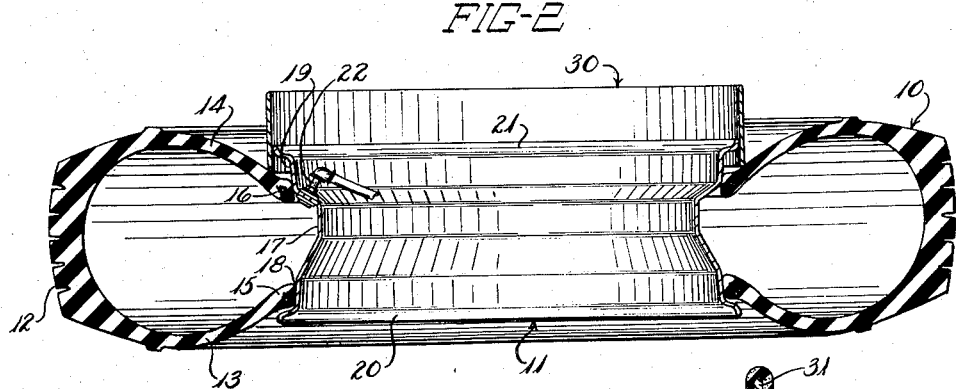

FIG-4
INVENTOR.
ALEXANDER J. VARVARO
BY
W. A. Fraser
ATTY.

United States Patent Office 2,874,761
Patented Feb. 24, 1959

2,874,761
BEAD SEATING AND INFLATING DEVICE FOR TUBELESS TIRES

Alexander J. Varvaro, Akron, Ohio, assignor to The Firestone Tire & Rubber Company, Akron, Ohio, a corporation of Ohio Application August 26, 1954, Serial No. 452,328

5 Claims. (Cl. 157—1.1)

The present invention relates to improvements in apparatus for inflating tubeless tires.

As tubeless tires have come into general use, the inflating of these tires has presented a problem arising from the difficulty of establishing initial contact between the tire beads and rim seats. The failure of a tire bead to contact its rim bead seat creates an opening between said bead and the rim through which the inflationary air escapes as rapidly as it enters the tire.

The present invention solves this problem in a simple and inexpensive manner by providing a cylindrical ring or sleeve that can be telescoped over the side flange of a rim and moved into sealing contact with the adjacent sidewall of a tire to create a closed chamber which will retain air and which will at the same time create a set of unbalanced forces on the sidewall to cause it to move into position on the bead seat. As the sidewall moves up toward the seat in response to the unbalanced forces the sidewall forces the sleeve away from the rim and the sleeve, as it moves with respect to the rim, maintains a sliding seal with the rim flange to keep the chamber closed and substantially airtight until the bead of the tire finally seats upon its rim seat. The sleeve is then easily removed from the rim.

An object of the present invention, therefore, is to provide an inexpensive, efficient and reliable means whereby tubeless tires may be quickly and surely inflated on a rim.

Another object of the invention is to provide means for inflating tubeless tires that will function equally well with all rims and tires within the widest ranges of manufacturing tolerances.

These and other objects and advantages of the present invention will be more apparent from the following description of a preferred form of the invention, reference being had to the accompanying drawing in which:

Figure 1 is a fragmentary sectional view showing a tubeless tire mounted on a rim together with a sleeve embodying the present invention fitted over the rim and in contact with the tire at the beginning of the inflating step;

Figure 2 is a fragmentary sectional view similar to Figure 1 showing the relative positions of the tire, rim and sleeve just as the tire bead makes sealing contact with the rim seat;

Figure 4 is a view similar to Figure 3 showing a modified form of the invention.

Figure 3:
Figure 3 is a section of the sleeve of Figures 1 and 2 showing on an enlarged scale the construction of the sleeve.

The invention is described with reference to a tubeless tire 10 which is shown mounted on a drop-center rim 11 in Figure 1. The tire 10 is of conventional construction comprising a tread 12, sidewalls 13 and 14 and beads 15 and 16. The rim 11 is likewise conventional comprising a drop-center well portion 17, tire bead seats 18 and 19 and side flanges 20 and 21. An inflation valve 22 is secured to the rim in an air-tight manner.

When the tire is mounted on the rim in the usual manner, the lower bead 15 can readily be forced by hand into sealing contact with its bead seat 18 but the remaining bead 16 tends to take a position out of contact with the other bead seat 19 leaving an appreciable gap indicated at 24 between the heel 25 of the bead 16 and the edge of the seat, see Figure 1. Under these circumstances, when air under pressure is introduced into the tire through the inflation valve 22 the air will escape at a rapid rate through the gap 24 between the bead and the rim, rendering futile all efforts to inflate the tire.

This difficulty is overcome by the present invention which comprises a cylindrical sleeve 30 having a diameter which enables it to slide over the upper side flange 21 of the rim and having a length which enables it to contact the adjacent sidewall 14 of the tire while still remaining in contact with the edge of the side flange. When the sleeve is in this position it defines a closed chamber bounded by the drop-center rim, the tire and the lower portion of the sleeve spanning the distance between the side flange and the tire. When air is introduced through the inflation valve, it will be confined within this closed chamber since the sleeve 30 maintains a seal with the sidewall 14 of the tire and with the side flange 21 of the rim.

As soon as air pressure builds up in this chamber the forces acting upon the sidewall 14 become unbalanced, the internal air pressure in the chamber acting to move the sidewall upward towards the bead seat 19 and this pressure is resisted only by the atmospheric pressure acting on the tire and by that small amount of internal pressure acting on the sidewall of the tire radially inside the sleeve. The internal pressure overbalances all the other forces and this disparity in forces acting on the sidewall of the tire causes the sidewall to move up and into contact with the bead seat. As this movement of the sidewall of the tire takes place the sleeve is forced upwardly but it maintains a sliding, substantially air-tight contact with the edge of the side flange and continues to define a closed chamber until the tire bead makes sealing contact with the rim. As soon as this happens the tire and rim act as an air container without the help of the sleeve and any further increase of air pressure within the tire will cause the bead 16 to move outwardly into final position on the seat.

Preferably the sleeve 30 comprises an endless sheet metal ring insert 31 which is coated on both sides with an outer layer 32 of vinyl plastic or the like. The inside diameter of the metal ring insert is appreciably larger than the largest rim flange diameter with which the sleeve is to be used and the layer 32 has a thickness preferably in the order of about ¼″–⅜″. The dimensions of the sleeve and the resilience and the compressibility of the outer layer 32 are such as to permit the sleeve to be used with rims of minimum side flange diameter as well as with rims of maximum diameter, the differences in diameter being compensated for by the varying compression in the layer 32. Thus the sleeve can be universally used with all rims of the same nominal size, within the range of manufacturing tolerances for such rims. The vinyl plastic preferably extends around the end of the sleeve so as to provide a resilient cushion to improve the sealing contact of the sleeve with the sidewall of the tire. In order to anchor the plastic coating securely to the metallic insert, the insert is perforated and the plastic extends through such perforations to form a unitary structure.

Figure 5:
Figure 5 is a view similar to Figures 3 and 4 showing yet another form of the invention.

It is, of course, not necessary that the sleeve have the particular construction described above. In some cases the inside of the sleeve may be coated with a layer 34 of sponge rubber as indicated in Figure 4. In other cases the metallic insert may be omitted and the sleeve, as shown in Figure 5, may be molded entirely of a suitable material 35 such as rubber or plastic.

Various other modifications will no doubt occur to those skilled in the art without departing from the spirit and scope of the invention, the essential features of which are summarized in the claims below.

I claim:

1. Apparatus for inflating and mounting a tubeless tire on a tire rim when one of the beads fails to make sealing contact with the corresponding rim seating surface, comprising pressure resisting means adapted to span the gap between said rim and the exterior surface of said tire sidewall and forming a closed chamber including the interior of said tire, said means including an axially slideable cylindrical member for making a first seal by sealing contact with the exterior surface of said tire intermediate said bead and the tread portion of said tire, and a second seal intermediate the rim and said cylindrical member to prevent loss of pressure from said closed chamber during axial sliding movement of said cylindrical member, said closed chamber enclosing a radially inward portion of said exterior surface of said tire sidewall and leaving a substantial area of the radially outward portion of said exterior surface exposed to the atmosphere, whereby when fluid under pressure is admitted to said chamber, unbalanced fluid pressure forces are imposed on said sidewall to move said sidewall and its bead toward contact with the rim, said cylindrical member being axially slideable to permit said movement of said sidewall.

2. A device to aid the inflating of a tubeless tire when said tire is mounted on a rim, said device comprising a sleeve havng an inside surface having a diameter not greater than the outside diameter of the side flange of said rim and adapted to seal against said flange in air tight relation said sleeve having a length sufficient to span the distance between the adjacent sidewall of said tire and said side flange when said sleeve is telescoped over said rim and is positioned in contact with the sidewall of said tire the axially inner edge of said sleeve adapted to seal against the sidewall of said tire, whereby said tire, rim and sleeve comprise a closed chamber retaining air under pressure during the initial stages of inflation and until the bead of said sidewall makes sealing contact with the bead seat adjacent said side flange.

3. A device to aid the inflating of a tubeless tire when said tire is mounted on a rim, said device comprising a sleeve having an inner layer of compressible material; said coating having an inside surface having diameter not greater than the outside diameter of the side flange of said rim and adapted to seal against said flange in air tight relation said sleeve having a length sufficient to span the distance between the adjacent sidewall of said tire and said side flange when said sleeve is telescoped over said rim and is positioned in contact with the sidewall of said tire the axially inner edge of said sleeve adapted to seal against the sidewall of said tire, whereby said tire, rim and sleeve comprise a closed chamber retaining air under pressure during the initial stages of inflation and until the bead of said sidewall makes sealing contact with the bead seat adjacent said side flange.

4. A device to aid the inflating of a tubeless tire when said tire is mounted on a rim, said device comprising a sleeve comprsing a metallic ring insert, an inner layer of compressible material about ¼ inch thick, the inside diameter of the surface of said inner layer being not greater than the outside diameter of the side flange of said rim and adapted to seal against said flange in air tight relation therewith, said sleeve having a length sufficient to span the distance between the adjacent sidewall of said tire and said side flange when said sleeve is telescoped over said rim and is positioned in contact with the sidewall of said tire the axially inner edge of said sleeve adapted to seal against the sidewall of said tire, whereby said tire, rim and sleeve comprise a closed, substantially air-tight chamber retaining air under pressure during the initial stages of inflation and until the bead of said sidewall makes sealing contact with the bead seat adjacent said side flange.

5. A device to aid the inflating of a tubeless tire when said tire is mounted on a rim, said device comprising a sleeve comprising a metallic ring insert, an inner layer of compressible soft rubber about ¼ inch thick, the inside diameter the surface of said inner layer being not greater than the outside diameter of the side flange of said rim, said sleeve having a length sufficient to span the distance between the adjacent sidewall of said tire and said side flange and adapted to seal against said flange in air tight relation therewith when said sleeve is telescoped over said rim and is positioned in contact with the sidewall of said tire the axially inner edge of said sleeve adapted to seal against the sidewall of said tire, whereby said tire, rim and sleeve comprise a closed substantially air-tight chamber retaining air under pressure during the initial stages of inflation and until the bead of said sidewall makes sealing contact with the bead seat adjacent said side flange.

References Cited in the file of this patent
UNITED STATES PATENTS

| | | |
|---|---|---|
| 400,600 | Rockwell | Apr. 2, 1899 |
| 1,521,342 | Thomas et al. | Dec. 30, 1924 |
| 1,548,136 | Grange | Aug. 4, 1925 |
| 2,221,056 | Mason | Nov. 12, 1940 |
| 2,418,849 | Polt | Apr. 15, 1947 |
| 2,518,126 | Daw et al. | Aug. 8, 1950 |